United States Patent [19]

Gold

[11] Patent Number: 4,742,996
[45] Date of Patent: May 10, 1988

[54] PNEUMATIC STRUT

[75] Inventor: Henning Gold, Bingen, Fed. Rep. of Germany

[73] Assignee: Audi AG., Ingolstadt, Fed. Rep. of Germany

[21] Appl. No.: 943,947

[22] Filed: Dec. 19, 1986

[30] Foreign Application Priority Data

Dec. 21, 1985 [DE] Fed. Rep. of Germany ....... 3545536

[51] Int. Cl.[4] ............................................... F16F 5/00
[52] U.S. Cl. .................................... 267/64.24; 267/35
[58] Field of Search .............. 267/15, 22 R, 35, 64.21, 267/64.24, 64.27, 121, 151; 188/321.11; 280/697, 710, 712

[56] References Cited

U.S. PATENT DOCUMENTS

| 973,223 | 10/1910 | Sharp | 267/64.24 |
| 1,077,472 | 11/1913 | Hofmann | 267/64.2 X |
| 2,922,636 | 1/1960 | Wordsworth et al. | 267/64.27 X |
| 3,395,931 | 8/1968 | Piret | 267/22 R X |

FOREIGN PATENT DOCUMENTS

| 1555319 | 10/1970 | Fed. Rep. of Germany . | |
| 2237058 | 2/1974 | Fed. Rep. of Germany . | |
| 1012982 | 12/1965 | United Kingdom | 267/64.24 |
| 1057455 | 2/1967 | United Kingdom . | |

Primary Examiner—Duane A. Reger

[57] ABSTRACT

A pneumatic spring and dampening strut for automotive vehicles comprising a housing having a closed end and an open end to form an elongated cylindrical chamber within which a piston is mounted for reciprocal and pivotal movement and dividing the chamber into a section acting as a spring and another chamber acting as a dampener. The dampening chamber is enclosed by a rolling bellows affixed to the piston rod and to the housing near its open end.

10 Claims, 4 Drawing Sheets

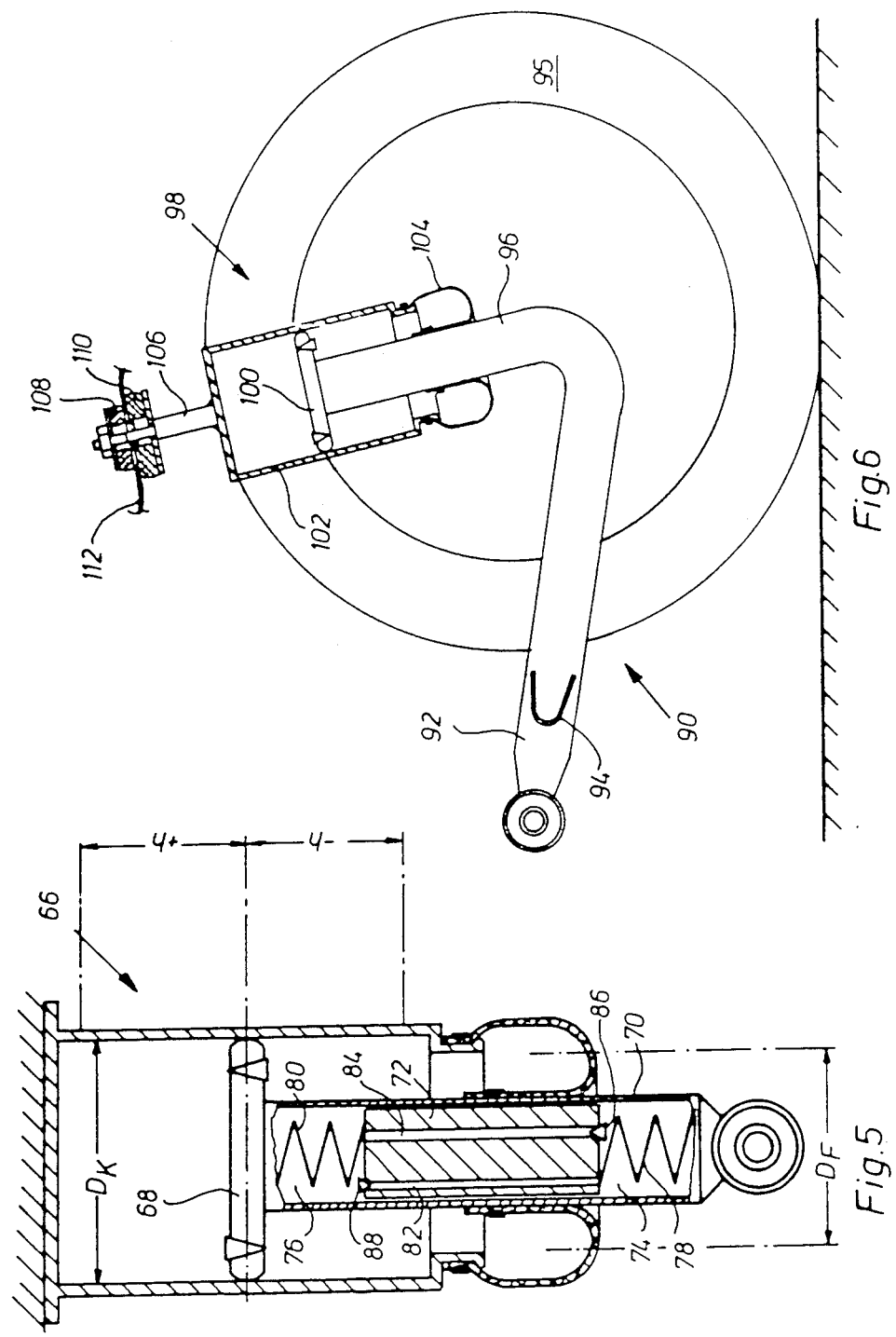

PNEUMATIC STRUT

REFERENCE TO RELATED APPLICATIONS

The subject matter of the present application relates generally to that of applications Ser. Nos.: 728,270 (Case A-029); 728,565 (Case A-027); 728,618 (Case A-028) all filed Apr. 29, 1985 now, respectively, U.S. Pat. No. 4,697,797 issued Oct. 6, 1987, U.S. Pat. No. 4,635,909 issued Jan. 13, 1987, and U.S. Pat. No. 4,647,025 issued Mar. 3, 1987, and U.S. Pat. No. 890,397 (Case A-039) filed July 28, 1986.

BACKGROUND OF THE INVENTION

1. Field of the Invention

The present invention relates generally to pneumatic struts and more particularly to pneumatic struts of the kind useful in providing both spring and dampening action in wheel suspension systems of automotive vehicles.

2. The Prior Art

Pneumatic struts for automotive vehicles are well known. They usually consist of a cylindrical housing divided by a piston into two chambers of complementing volumes. The piston is mounted for reciprocal movement within the housing. The piston may be provided with a throttle arrangement for limited bidirectional gas exchange between the two chambers, and with a piston rod one end of which may be connected to one end of a rolling bellows. The other end of the rolling bellows may be affixed to the cylindrical housing to form a third chamber having a volume dependent upon the position of the piston within the cylinder at any given moment.

A strut of this general kind is disclosed, for instance, in U.S. Pat. Nos. 4,697,797, 4,635,909, and 4,647,025, supra. The strut there shown is provided with a piston which is telescopingly or reciprocally moveable within a cylindrical housing. The strut is of relatively complex or complicated structure in that it comprises not less than three pneumatic chambers with attendant seals and guide bushings. One of the chambers functions as a load bearing chamber the volume of which is reduced as the load borne by the strut increases. The load bearing chamber is enclosed by a bottom closure of the cylindrical chamber and a rolling bellows. In the bottom closure there is provided a guide bushing for guiding the piston rod. The other two chambers function as dampening chambers. They are located within the cylindrical housing and are separated from each other by the piston.

While the performance of such a strut is generally satisfactory, it is relatively complex in that it requires many guide means and pneumatic seals or packings of great precision.

Accordingly, it is an object of the present invention to provide a pneumatic strut of simplified construction.

Moreover, it is an object of the invention to provide a pneumatic strut with simplified guide means or bushings.

It is also an object of the invention to provide a pneumatic strut with simplified pneumatic seals or packings.

An object of the invention is also to provide a novel strut having a piston pivotally moveable relative to its cylinder.

A further object of the invention resides in the provision of a pneumatic strut in which a piston and a piston rod are pivotally as well as reciprocally moveable as a unitary structure with respect to their cylinder without impairing the seal between the piston and the cylinder wall.

Yet another object of the invention is to provide a pneumatic strut arrangement which, while of simpler construction than apparatus of this kind hitherto available, is nevertheless of reliable and superior performance to be useful in the wheel suspension system of an automotive vehicle.

Other objects will in part be obvious and will in part appear hereinafter.

SUMMARY OF THE INVENTION

In the accomplishment of these and other objects the invention provides, in a preferred embodiment thereof, a pneumatic strut comprising a cylindrical housing divided by a piston into a dampening chamber and another chamber acting as a spring as well as a dampening chamber. The piston and piston rod are mounted within the cylindrical chamber for pivotal as well as reciprocal movement. The diameters of the piston and of the rolling bellows differ from each other by a predetermined ratio. Depending upon the amplitude of spring action the ratio of the piston diameter relative to the diameter of the effective spring is preferably between about 1.2 and about 1.6.

In the strut of the present invention the spring and dampening chambers are combined into a single chamber enclosed by the cylindrical housing and the piston. A counteracting dampening chamber located on the opposite side of the piston is enclosed by the piston and the rolling bellows.

The volumes of the spring chamber and of the dampening chamber are relevant considerations in seeking to provide for appropriate dampening of the chassis and of the axle or wheel suspension of a vehicle. Unavoidable dead spaces, the amplitude of strut movement and pneumatic pressure are further factors which need to be taken into consideration.

Considering the usual spring amplitudes and pressures, a ratio of the piston diameter $D_K$ relative to the spring diameter $D_F$ of about 1.2 to about 1.6 has been found to be advantageous and assures a comfortable level of dampening of the vehicle chassis and the axle over the entire load range, i.e. between tare weight and gross weight of the vehicle. Ratios $>1.6$ were found by the inventor to lead to inefficient results given the excessive structure required to yield such large ratios; at ratios of about 1.35 or less, dampening of the axle was no longer satisfactory; and ratios $<1.2$ led to an insufficient dampening of the vehicle chassis. However, ratios as herein set forth have yielded very satisfactory results given the limited mounting space available in automotive vehicles and the requisite longevity of the strut.

Ratios of from about 1.3 to about 1.5 were found to be advantageous in spring amplitudes of about 100 mm. At amplitudes of about 120 mm, ratios between about 1.5 and 1.6 were found to be useful, and at amplitudes of about 70 mm, ratios between 1.2 and 1.4 yielded satisfactory results. At ratios $D_K/D_F < 1.36$ a dampening absorptive mass may be provided for additional dampening of the axle. As an especially useful measure for saving space such an absorptive mass may be mounted within the piston rod of the strut. In accordance with the invention it is not necessary to provide a guide bushing for the piston rod; rather, the piston may be mounted for pivotable movement within the cylindrical housing of the strut. Except for the somewhat more elaborate sealing required between piston and cylinder of such an arrangement, the advantages attainable with an arrangement in accordance with the invention include a favorable structure which will not bind, tilt or cant, and a piston rod which is simple to manufacture in that it requires none of the precision required of piston rods mounted in guide bushings. The dampening chamber may be hermetically sealed by the rolling bellows;. The pivotability of the piston rod does not adversely affect such a seal.

Sealing between the piston and the cylinder wall may be established by an elastic piston ring seated in a sleeve as hereinafter set forth in detail. The sleeve may be of a material having superior sliding characteristics such as polytetrafluoroethylene (Teflon) or metals saturated therewith. The elasticity of the piston ring assures a tight fit or seal between the piston and the wall of its cylinder even at an inclined position relative thereto. To permit radial expansion the piston ring may be provided with a step-like separation or gap. The sleeve may be made as a separate element or it may be laminated to the elastic piston ring. Advantageously, the elastic ring is seated within an annular groove of the piston. The piston and/or the piston ring may have a radially bulging contour to assure smooth pivotal movement of the piston and piston rod within the cylinder.

Advantageously, either the piston or the cylindrical housing may be rigidly connected with the wheel support structure, for instance by a longitudinal arm. The element not connected with the wheel suspension may then be mounted for pivotal movement on the chassis. This simplifies the overall structures and reduces the number of parts otherwise required. In an advantageous embodiment the piston rod may be directly connected to a longitudinal arm of a rear axle, and the cylindrical housing may be pivotably connected to the chassis. Since such a structure would require relatively little mounting space, lower rear sections of the vehicle may be configured to provide ample room for the wheels without encroaching upon the size of the trunk.

In a further advantageous embodiment, the strut may be utilized as a supporting structure for a steerable wheel of a vehicle. The piston rod may be canted or inclined adjacent the rolling bellows relative to the longitudinal axis of the cylindrical housing to reduce transverse forces. Independently of such an inclination, the center of the wheel support at any given moment is defined by the inclination of the longitudinal axis of the housing relative to a vertical plane.

BRIEF DESCRIPTION OF THE DRAWINGS

The novel features believed to be characteristic of the invention have been set forth with particularity in the appended claims. The invention itself, however, including its organization, material structure, and method of operation, together with other objects and advantages thereof, will be best understood from the following detailed description when read in connection with the accompanying drawings wherein:

FIG. 5 is a view in longitudinal section of a strut in accordance with the invention having an absorptive mass mounted in its piston rod;

FIG. 6 is a schematic presentation of a strut according to the invention as mounted on the rear axle of a vehicle.

DETAILED DESCRIPTION

Figure 1:
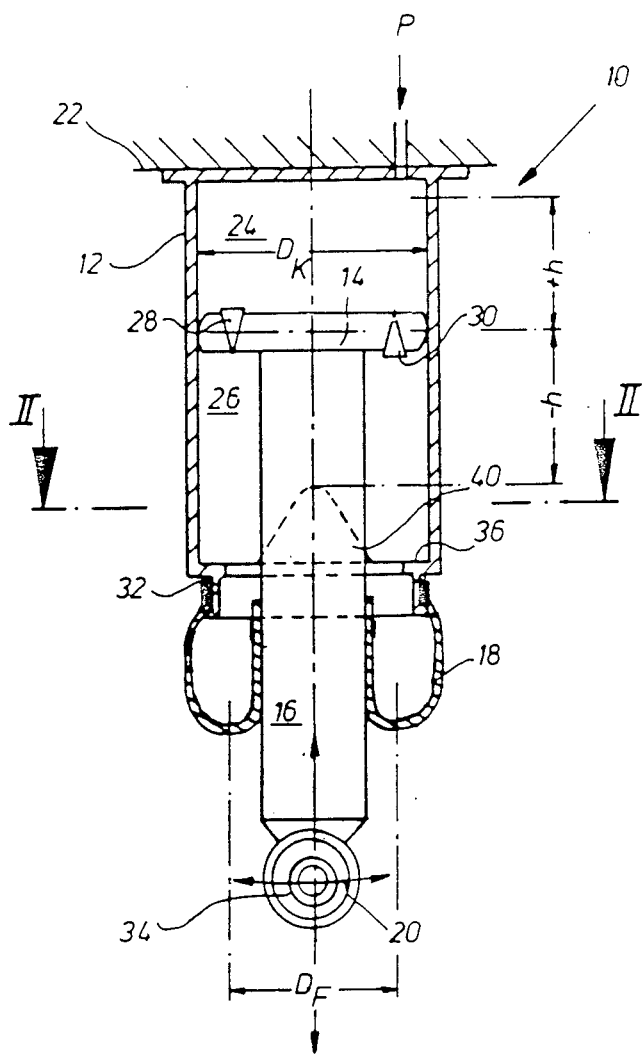
FIG. 1 is schematic presentation, partially in longitudinal section, of a pneumatic strut in accordance with the invention.

The basic structure of a pneumatic strut 10 in accordance with the invention is shown in FIG. 1 to include a cylindrical housing 12. A piston 14 is mounted for reciprocal movement within the housing 12. The piston 14 is of disklike configuration and is rigidly connected to one end of a piston rod 16. In the manner to be described, the piston 14 and the piston rod 16 are mounted for pivotal movement relative to the longitudinal axis of the cylinder 12. The major plane of the pivotal movement is indicated by an arrow 20.

The housing 12 may be affixed to the chassis of an automotive vehicle, schematically shown at 22. For noise insulation, rubber blocks (not shown) or the like may be provided in the connection between the strut 10 and the vehicular structure 22. In certain circumstances the housing 12 may be formed integrally with the chassis 22 of the vehicle. The housing 12 is divided by the piston 14 into two chambers 24 and 26. The chamber 24 functions as a spring chamber as well as a dampening chamber, whereas the chamber 26 functions substantially as a dampening chamber only. That is to say, the volume of the chamber 24 is reduced as the strut 10, under load, is subjected to compaction or contraction, and at the same time the volume of the chamber 26 is increased. Conversely, as the strut 10 expands, the volume of chamber 24 is increased while the volume of chamber 26 is decreased. The piston 14 is seen to be provided with a throttle arrangement, schematically shown at 28 and 30, to permit bidirectional exchange of pressurized gas between the chambers 24 and 26. The specific structure of the throttle means 28 and 30 is immaterial to the present invention and will not, therefore, be described. It may, however, be of the kind disclosed generally in the above-mentioned; U.S. Pat. Nos. 4,697,797, 4,635,909 and 4,647,025. The chambers 24 and 26 may be connected to a suitable pressure source (not shown) to maintain and control a predetermined level p of pneumatic pressure within them.

The dampening chamber 26, shown as the lower chamber in FIG. 1, is enclosed by a rolling bellows or lobe 18. One end of the rolling bellows 18 may be affixed to a downwardly extending necked-down collar 32 of the cylindrical housing 12 by suitable means, such as a clamp (not shown). At its inwardly folded other end the rolling bellows 18 may be affixed similarly to the piston rod 16. At its end opposite the piston 14 the piston rod 16 is provided with a mounting bracket 34 by which it may be mounted to a wheel suspension (not shown) such as, for instance, the rear axle of an automotive vehicle.

Figure 2:
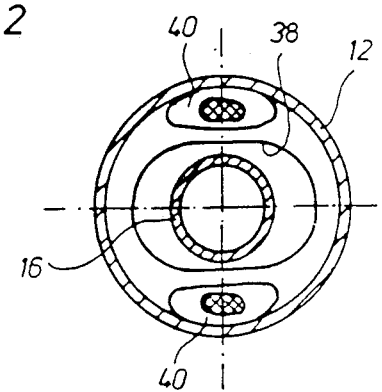
FIG. 2 is a sectional view along line II—II of FIG. 1.

An inwardly directed flange 36 is affixed to the interior of the cylindrical housing 12 near its bottom. The flange is provided with an oblong or substantially elliptical aperture 38 (FIG. 2) to permit relatively large pivotal movement of the piston rod 16 in the plane indicated by the arrow 20. Elastic pads 40, such as rubber blocks, are provided as abutments at opposite sides of the aperture 38, near its minor axis. These pads 40 are effective in a direction normal to the longitudinal axis of the piston 14 to eliminate or at least reduce canting or tilting forces affecting the piston 14 when the piston rod 16 engages either pad 40.

Figure 3:
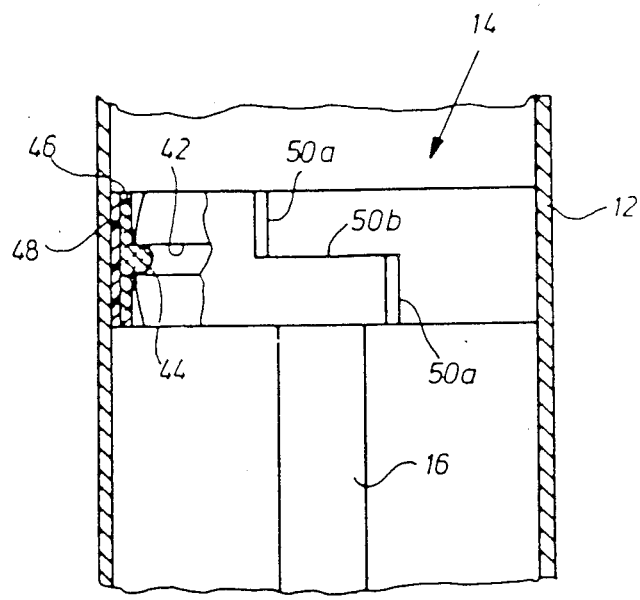
FIG. 3 is an enlarged view of the piston of the strut of FIG. 1.
Figure 4:
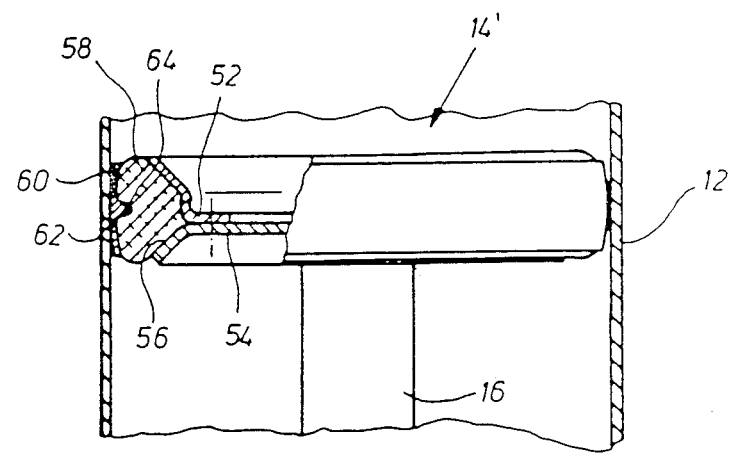
FIG. 4 is an enlarged view of a different piston for use with a strut in accordance with the invention.

Pivotal movement of the piston rod 16 and of the piston 14 is possible on the one hand because of the oblong configuration of the aperture 38 at the bottom of the housing 12 and on the other hand because of the configuration of the piston 14 and/or its seal as shown in FIGS. 3 and 4 which allows an inclined positioning of the piston 14 within the cylindrical housing 12.

If, for instance, the strut 10 would be connected to an axle (or wheel suspension) by way of a spring plate or torsion bar (not shown) in such a manner that a wheel (not shown) could move with an amplitude h, i.e. upward and downward movement relative to a median position, of ±100 mm, the ratio of the diameter $D_K$ of the piston 14 relative to the effective diameter of the rolling bellows 18 (=effective spring surface $D_F$) should advantageously be about 1.4.

A similarly structured strut cooperating with a spring plate or torsion bar providing for an amplitude of wheel movement of about 130 mm would call for a ratio $D_K/D_F$ between about 1.5 and 1.6. Of course, actual values are a matter of specific structural characteristics of a vehicle, as for instance, the structure of the axle, of the tires, and of the desired dampening action.

As shown in FIG. 3, the piston 14 has a bulging peripheral contour bisected by a circumferential groove 42. An elastic piston ring 46 is seated within the groove 42 and is retained therein by an annular protrusion 44 positioned on the inner circumference of the ring 46. The piston ring 46 may be made of rubber or similar material. The piston ring 46 is seen to be mounted within a sleeve 48 and may be connected thereto by vulcanization or the like. The sleeve 48 is preferably made of a low friction material such as a metal web impregnated with polytetrafluoroethylene (Teflon). The sleeve 48 and the piston ring 46 function as a sealing ring and may be provided with an approximately Z-shaped separation or gap comprising two axially extending sections 50a and a peripherally extending section 50b. The peripheral section 50b may be positioned within the annular groove 44 to maintain axial stability and a tight seal of the sealing ring 46, 48 even in the peripheral section 50b of the gap.

When the piston 14 pivots to an inclined position within the cylindrical housing 12 the sealing ring 46,48 will roll over the bulging peripheral surface of the piston 14 to maintain a tight seal and provide secure guidance of the piston 14 within the housing 12 the inclined orientation of the piston 14 notwithstanding.

An alternative embodiment of a piston 14' is shown in FIG. 4. The piston 14' is constructed of two superposed disks 52 and 54 peripheral portions of which are flared out to form a peripheral groove of substantially V-shaped cross-section. An elastic sealing ring 58 may be seated within the groove 56. A sleeve 60 preferably made of a low-friction material such as polytetrafluoroethylene (Teflon) may be retained on the sealing ring 58 by way of an annular protrusion seated within a groove 62 in the periphery of the ring 58. Alternatively, the sleeve 60 may be affixed to the ring 58 by adhesive or vulcanization. The sleeve 60 and the elastic ring 58 may have a slighty bulging periphery to assure, in cooperation with the inherent elasticity of the ring 58, a tight seal and easy movability of the piston 14' within the housing 12' even when the piston 14' assumes an inclined position therein.

FIG. 5. discloses a further embodiment of a strut 66 in accordance with the present invention. A piston 68 affixed to a piston rod 70 is mounted for reciprocal and pivotal movement within a cylindrical housing of the strut 66. The piston rod 70 is formed as a hollow cylinder within which an absorptive mass 72 is mounted for reciprocal movement. The absorptive mass 72 may dampen axle movements of a vehicle (not shown) independently of the dampening action of the strut 66. The absorptive mass 72 functions as a piston and divides the cylindrical chamber of the piston rod 70 into two dampening chambers 74 and 76. Helical springs 78 and 80 acting on opposite axial surfaces of the absorptive mass 72 and supported by top and bottom closures of the piston rod 70 may bias the absorptive mass 72 into a position substantially in the axial center of the piston rod 70. Instead of the helical springs shown other springs, such as rubber springs, may also be utilized. Two overflow bores 82 and 84 having appropriate throttle arrangements 86 and 88 are provided within the absorptive mass 72 to permit its operation either pneumatically or hydraulically.

The strut 66 may, for instance, be mounted in a wheel suspension arrangement (not shown) providing for an amplitude of vertical sheel movement of about 100 mm. The strut 66 may be affixed to an elongate arm one end of the other end of which may be affixed to an axle. Given a length of 70 mm for the arm, the resultant transmission ratio would be 0.7. The ratio of the diameter of the piston $D_K$ relative to that of the spring $D_F$ would be 1.3. If the piston rod 72 is subjected to vibrations from an axle or wheel suspension of the vehicle (not shown) the absorptive mass 72 provides for definable additional dampening of the axle owing to its axial motion and the resultant bidirectional exchange of gas (or fluid) between the absorption chambers 74 and 76 through the bores 82 and 84.

FIG. 6 is a longitudinal sectional view of an axle arrangement 90 along the center longitudinal plane of a vehicle (not shown). The axle arrangement 90 comprises two longitudinal arms 92 (only one shown) and a twistable transverse suspension rod 94 for interconnecting the longitudinal arms 92. The arms 92 may be connected to the chassis of the vehicle and may be provided with an axle stubs (not shown) for rotationally mounting a wheel 95.

In the arrangement shown in FIG. 6, the arm 92 may be integrally formed with a piston rod 96 of a strut 98. The piston rod 96 extends into the interior of a cylindrical housing 102 of the strut 98 and is connected to a piston 100. The end of the housing 102 through which the piston rod 96 extends is shown to be closed by a rolling bellows 104 in the manner described supra.

A mounting stud 106 may be affixed, as by welding or the like, to the opposite end of the housing 102 for connecting the housing 102 to the chassis 112 of the vehicle. Rubber mounts 108 and 110 or the like may be used to render this connection flexible or elastic.

When the wheel suspension or the chassis is subjected to spring movement the movement of the piston 100 along a circular path may thus be compensated by a corresponding pivoting of the housing 102. This is to say that by way of kinematic reversal the cylindrical housing 102 is guided by the piston 100 which is rigidly connected to the arm 92 by the piston rod 96, rather than vice versa. As will be appreciated by those skilled in the art the structure of the strut 98 is substantially equivalent to the structure of previously described embodiments.

Figure 7:
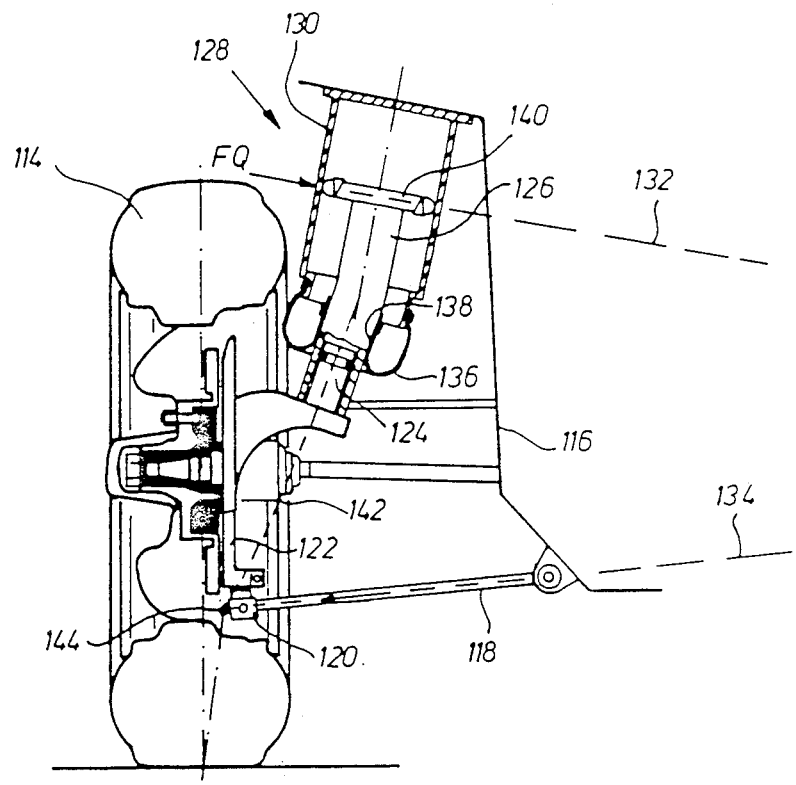
FIG. 7 is a schematic representation of a strut according to the invention as mounted on a steerable wheel of a vehicle.

FIG. 7 is a schematic presentation of a suspension arrangement of a steerable front wheel 114 of an automotive vehicle. A chassis 116 of the vehicle is connected to a wheel support 122 by a control arm 118. The control arm 118 is connected to the wheel support 122 by a conventional ball joint 120. One end of a cantilever is connected to the wheel support 122 at its side opposite the wheel 114. The other end of the cantilever supports an upwardly extending spindle 124. A piston rod 126 of a pneumatic spring and dampening strut 128 is journalled on the spindle 124. The rotatable connection between the spindle 124 and the piston rod 126 includes a roller bearing as well as conventional means (not shown) for preventing their axial displacement. In a manner not shown here, canting or tilting moments could be substantially avoided by coaxially arranging the rotational bearing and the piston 140. In such a structure a simple ball bearing could replace the roller bearing. Also, by mounting a second bearing at a predetermined spacing from the roller bearing rattling noises could be avoided.

The cylindrical housing 130 of the strut 128 may be connected to the chassis 116 relatively rigidly. The center of the wheel suspension at any given moment is defined by the intersection of a line 132 normal to the axis of the housing 130 and coplanar to the piston 140 and a line 134 coaxial with the control arm 118.

For the compensation of transversal forces FQ acting near the piston 14 a section 138 of the piston rod 126 to which the rolling bellows 136 is connected may be inclined relative to the center axis of the housing 130 in such a manner that an extension 142 of the axis of section 138 would intersect with the intersection of line 134 and the center plane of the wheel 114. By appropriately bending the piston rod 126 and by a corresponding inclination of the rolling bellows 136 transversal forces could therefore be compensated independently of the angular position of the housing 130 relative to a vertical plane by which the center of the wheel suspension at any given moment is defined.

Persons skilled in the art will appreciate that with an unsteerable wheel 114 the piston rod 126 could be directly connected to the wheel support 122. In such a structure, the pneumatic strut 128 could be modified in a manner resembling the struts described above.

What is claimed is:

1. A pneumatic spring and dampening strut for use in an automotive vehicle having chassis means and axle means, comprising:
   a substantially rigid cylindrical housing having an elongated chamber of substantially circular cross-section therein, said chamber being closed at one of its ends and having an opening at its opposite end;
   piston means of a first diameter for dividing said chamber into a first section providing spring action and a second section providing dampening action, said piston means being mounted within said chamber for reciprocal movement of a predetermined amplitude and comprising throttle means for limited bidirectional exchange of gas between said first and second sections during said movement;
   piston rod means affixed at one end to said piston means and protruding from said opening of said chamber by its other end; and
   rolling bellows means having an effective second diameter and being affixed at one end to said housing adjacent said opening and at its other end to said other end of said piston rod means for enclosing said second section, the ratio of said first diameter relative to said second diameter being from about 1.2 to about 1.6.

2. The strut of claim 1, wherein said piston means and said piston rod means are mounted for pivotal movement at least in a predetermined plane within said chamber, said piston means comprising a peripherally bulging circumferential surface and said opening in said chamber being of oblong configuration having a major axis substantially parallel to said plane of pivotal movement and exceeding the diameter of said piston rod means.

3. The strut of claim 2, further comprising an elastic piston ring surrounded by a sleeve member of low friction material and including a radially inwardly protruding flange and wherein said piston means is provided with a circumferential groove for receiving said radially inwardly protruding flange, said piston ring having a gap configured to have at least one axially extending portion and a circumferentially extending portion, said circumferentially extending portion extending through said flange means.

4. The strut of claim 3, wherein said low friction material comprises polytetrafluoroethylene.

5. The strut of claim 1, wherein said axle comprises a longitudinal arm and one of said housing and said piston rod means is integral with said longitudinal arm and the other of said piston rod means and said housing is pivotally mounted on said chassis means.

6. The strut of claim 1, wherein said amplitude measures about 100 mm and said ratio is from about 1.3 to about 1.5.

7. The strut of claim 1, wherein said amplitude measures about 120 mm and said ratio is from about 1.5 to about 1.6.

8. The strut of claim 1, wherein said amplitude measures about 70 mm and said ratio is from about 1.2 to about 1.4.

9. The strut of claim 8, wherein said piston rod means comprises a hollow cylindrical chamber for receiving an absorptive means axially slideable therein for dampening vibrations axially affecting said piston rod means.

10. The strut of claim 9, wherein said absorptive mass comprises piston means provided with spring means for biasing said absorptive mass into an axially substantially central position of said hollow chamber.

* * * * *